(12) United States Patent
Patel et al.

(10) Patent No.: US 11,029,252 B2
(45) Date of Patent: Jun. 8, 2021

(54) GEMSTONE PROFILING

(71) Applicant: Sahajanand Technologies Private Limited, Gujarat Surat (IN)

(72) Inventors: Chetan Fulchandbhai Patel, Gujarat Surat (IN); Munjalkumar Dhirajlal Gajjar, Surat (IN); Rahul Mahendra kumar Gaywala, Surat (IN)

(73) Assignee: Sahajanand Technologies Private Limited, Gujarat Surat (IN)

( * ) Notice: Subject to any disclaimer, the term of this patent is extended or adjusted under 35 U.S.C. 154(b) by 0 days.

(21) Appl. No.: 16/623,918

(22) PCT Filed: Jun. 6, 2018

(86) PCT No.: PCT/IN2018/050369
§ 371 (c)(1),
(2) Date: Dec. 18, 2019

(87) PCT Pub. No.: WO2018/225089
PCT Pub. Date: Dec. 13, 2018

(65) Prior Publication Data
US 2020/0232930 A1 Jul. 23, 2020

(30) Foreign Application Priority Data
Jun. 8, 2017 (IN) .............................. 201721020156

(51) Int. Cl.
*G01N 21/00* (2006.01)
*G01N 21/87* (2006.01)
*G01B 11/24* (2006.01)

(52) U.S. Cl.
CPC ............. *G01N 21/87* (2013.01); *G01B 11/24* (2013.01); *G01N 21/00* (2013.01)

(58) Field of Classification Search
CPC .......... G01N 21/87; G01N 21/00; G01B 11/24
See application file for complete search history.

(56) References Cited

U.S. PATENT DOCUMENTS

| | | |
|---|---|---|
| 6,567,156 B1 | 5/2003 | Kerner |
| 2008/0231833 A1 | 9/2008 | Shlezinger et al. |

(Continued)

FOREIGN PATENT DOCUMENTS

WO   WO-2018225089 A1   12/2018

OTHER PUBLICATIONS

"International Application No. PCT/IN2018/050369, Article 19 amendments filed Nov. 23, 2018", (Nov. 23, 2018), 8 pgs.

(Continued)

*Primary Examiner* — Abdullahi Nur
(74) *Attorney, Agent, or Firm* — Schwegman Lundberg & Woessner, P.A.

(57) ABSTRACT

Aspects relating to gemstone profiling are described. A gemstone profiling system includes a holder that is rotatable by an actuator and can hold a gemstone, the gemstone having a reference mark. The system includes a non-contact measuring unit to determine a distance between a center of rotation of the gemstone and a surface of the gemstone. Further, the system includes a controller to rotate the gemstone through a plurality of orientations and receive the measured distance between a center of rotation of the gemstone and a surface of the gemstone in each of the plurality of orientations of the gemstone. The controller can generate a profile of the gemstone based on the received distance in the plurality of orientations.

6 Claims, 4 Drawing Sheets

(56) References Cited

U.S. PATENT DOCUMENTS

| | | | |
|---|---|---|---|
| 2009/0182520 A1* | 7/2009 | Luxembourg | G01N 33/381 702/81 |
| 2010/0250201 A1 | 9/2010 | Sivovolenko | |
| 2017/0021530 A1 | 1/2017 | Gaywala et al. | |

OTHER PUBLICATIONS

"International Application No. PCT/IN2018/050369, International Search Report and Written Opinion dated Sep. 24, 2018", (Sep. 24, 2018), 10 pgs.

* cited by examiner

GEMSTONE PROFILING

PRIORITY CLAIM TO RELATED APPLICATIONS

This application is a U.S. national stage filing under 35 U.S.C. § 371 from International Application No. PCT/IN2018/050369, filed on 6 Jun. 2018, and published as WO2018/225089 on 13 Dec. 2018, which claims the benefit under 35 U.S.C. 119 to India Application No. 201721020156, filed on 8 Jun. 2017, the benefit of priority of each of which is claimed herein, and which applications and publication are hereby incorporated herein by reference in their entirety.

TECHNICAL FIELD

The present subject matter relates, in general, to gemstone technology and, particularly but not exclusively, to gemstone processing.

BACKGROUND

Gemstones are naturally occurring deposits of minerals and can include, for example, diamonds, quartz, opals, sapphires, rubies, emeralds, and topaz. Since the gemstones are rare, they are highly valued for use, say in ornamentation and jewellery. The value of these gemstones results from their color, luster, and the manner in which they transmit, refract, or reflect rays of light. For the enhancement of such properties, rough gemstones are processed, for instance, by cutting, faceting, shaping, and polishing. The processing of the gemstone imparts certain characteristics to a gemstone. For example, the value of a processed gemstone is generally determined by the 4Cs, i.e., carat (weight), clarity (transparency), color, and cut which are directly or indirectly affected by the processing technique. Therefore, techniques for effective gemstone processing have been areas of active research. One such technique that allows for effective gemstone processing is gemstone profiling.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
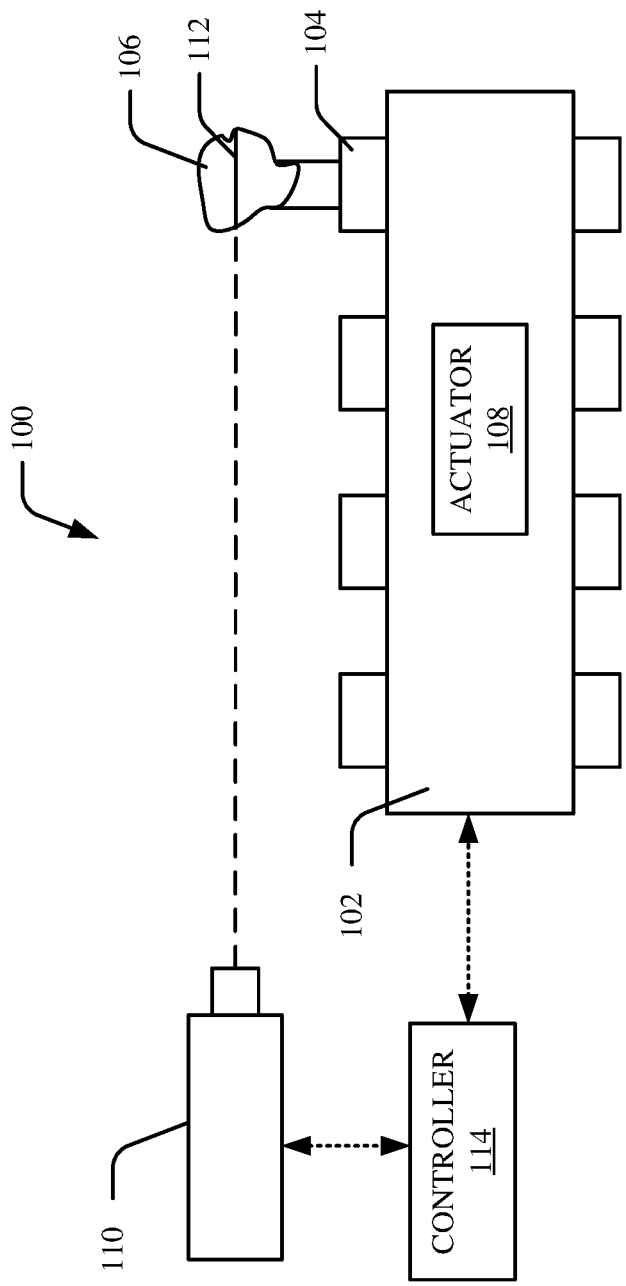
FIGS. 1A and 1B illustrate different views of a schematic of a gemstone profiling system, in accordance with an embodiment of the present subject matter.

The present subject matter relates to aspects relating to profiling of gemstones. As mentioned previously, in recent times techniques, such as gemstone profiling, which facilitate effective processing of gemstones have been areas of active research.

Gemstone profiling refers to the process of creating an external profile of a surface of the gemstone. Profiling the gemstone facilitates in the planning of gemstone processing. For example, based on the profile, the cut and shape of the gemstone that is to be achieved is determined. Conventionally, the profile of the gemstone is generated manually. For instance, the gemstone is placed in a holder and images are captured in arbitrary directions in order to obtain the profile. However, the arbitrarily taken images may not provide an effective approximation of the profile of the diamond. Other conventional techniques of gemstone profiling involve use of advanced and expensive machines having multiple three-dimensional scanners to scan the entire surface of the gemstone and generate a profile of the gemstone. While the profile so generated by such advanced machines is highly accurate, it comes at hefty cost of capital investment in such equipment.

The present subject matter relates to techniques of gemstone profiling which allow the generation of a profile of a gemstone with the use of low-cost equipment having limited or no manual intervention. Therefore, the gemstone profiling achieved in accordance with the techniques of the present subject matter provides a considerably accurate profile of the gemstone and involves substantially low cost in generating the profile. In other words, the profile generated in accordance with the present subject matter achieved is an apt tradeoff between the accuracy of the profile generated and the cost associated with the equipment used for the generation of the profile.

According to an aspect, the gemstone profiling involves determining a distance from the center of the gemstone to its surface in different orientations, the distance is measured with reference to a reference mark on the surface of the gemstone. These values of the distance, for example, the radii of the gemstone along one or more reference lines on its surface, is used to generate the profile of the gemstone.

Accordingly, in an embodiment, the gemstone is mounted in a holder that is rotatable, say using an actuator. The gemstone is, therefore, rotatable through a plurality of orientations or positions using the actuator. Further, using a non-contact measuring unit fixed with respect to the gemstone, a distance of the reference mark on the gemstone from the non-contact measuring unit is measured in each of the plurality of orientations. Based on the distance measured, a primary dimension of the gemstone in each of the plurality of orientations can be determined based on the distance of the reference mark from the non-contact measuring unit on the gemstone in respective orientation of the gemstone. In one example, the primary dimension can be the distance between the center of the gemstone and the surface of the gemstone along the reference mark. In another case, the non-contact measuring unit can directly measure the primary dimension along the reference mark. As will be understood, the primary dimension can be dimension, such as radii or depth, that is relevant for processing of the gemstone.

Further, the profile of the gemstone is generated based on the primary dimension in each orientation of the gemstone. The profile can be used for processing the gemstone. For example, the profile can include cutting parameters for processing the gemstone, say focal points, height, stroke length, banding angles, and depth for each side of banding.

The gemstone profiling, in accordance with the present subject matter, is convenient and low cost, and at the same time, determines the profile of the gemstone with substantial accuracy. Therefore, the gemstone profiling of the present subject matter facilitates in optimization of the resources used for profiling against the correctness with which the profile of the gemstone is generated.

These and other advantages of the present subject matter would be described in greater detail in conjunction with the following figures. While aspects of gemstone profiling can be implemented in any number of different configurations, the embodiments are described in the context of the following device(s) and method(s).

Figure 1B:
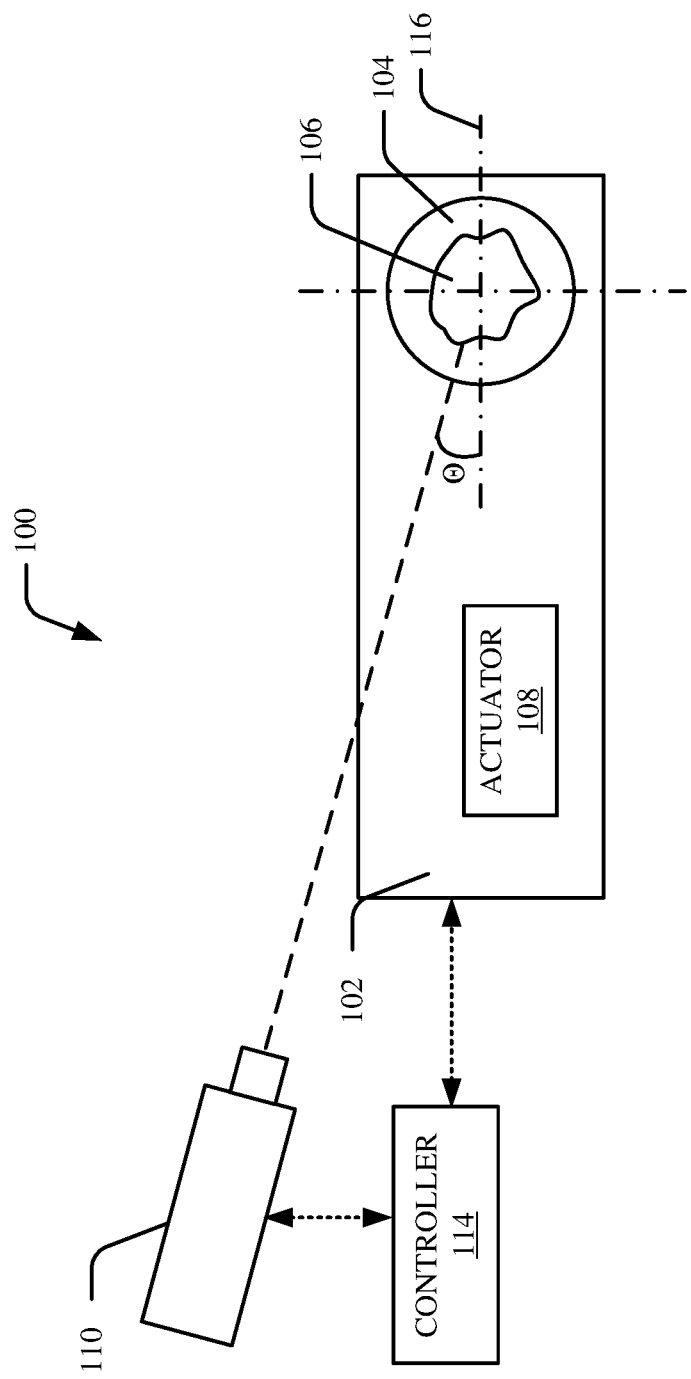

FIG. 1A and FIG. 1B illustrate schematics of a gemstone profiling system 100 for generating a profile of a gemstone, such as a rough gemstone, in accordance with an embodiment of the present subject matter. While FIG. 1A illustrates a top view of the gemstone profiling system 100, FIG. 1B illustrates a side view of the gemstone profiling system 100. For the sake of brevity and ease of understanding, FIG. 1A and FIG. 1B will be described in conjunction henceforth.

The gemstone profiling system 100, according to the present subject matter, provides for a planning step in the gemstone processing cycle. As the name suggests, in this step, a profile, such as a surface profile, of the rough gemstone is generated using the gemstone profiling system 100 with substantial accuracy. According to an aspect, the gemstone profiling system 100 can determine a primary dimension associated with the gemstone in different orientations. The primary dimension can be measured with reference to a reference mark on the surface of the gemstone. The gemstone profiling system 100 can use these values of the primary dimension, for example, the radii of the gemstone along one or more reference lines on its surface, to generate the profile of the gemstone. Accordingly, in the planning phase, the gemstone profiling system 100 can determine various operations to be performed and the manner of further processing of the rough gemstone can be charted in accordance with the identified profile. As will be understood, the rough gemstone can be the gemstone in the natural, non-processed condition.

In accordance with an embodiment of the present subject matter, the gemstone profiling system 100 can include a frame 102 and a holder 104 for holding a gemstone 106, such that the holder 104 is rotatable with respect to the frame 102. For example, in the position where the gemstone 106 is mounted in the holder 104, the holder 104 can be rotatable about a central axis coinciding with a center of the gemstone 106. In simpler terms, when mounted in the holder 104 and rotated, the gemstone 106 exhibits a rotation about its center.

For providing the rotational movement to the holder 104, the gemstone profiling system 100 can include one or more actuators 108 coupled to the holder 104. In an example, the actuator 108 can simply be a motor, say a servo motor, or an assembly including a motor and a gear box for generating an appropriate amount of torque to rotate the holder 104. In addition, the actuator 108 can include other assemblies or components that can be used for providing a rotational movement to the holder 104.

In addition, as part of profile generation, the gemstone profiling system 100 includes a non-contact measuring unit 110 which is fixed with respect to the holder 104, and therefore, the gemstone 106. As mentioned above, as part of generation of the profile, the non-contact measuring unit 110 is to determine a distance between a center of rotation of the gemstone 106 and a surface of the gemstone 106 along a reference mark 112 on the gemstone 106. In an example, the gemstone can have a reference mark 112 on its surface before it is mounted to the gemstone profiling system 100. In other words, the gemstone can be referenced beforehand. In another example, the gemstone profiling system 100 can include a marking system (not shown) that can be used for making the reference mark 112 on the gemstone 106. For instance, the reference mark 112 can be in the form of one or more continuous lines running along the periphery of the gemstone 106. For example, in case the gemstone 106 is substantially spherical, the reference mark 112 can be in the form of multiple lines running along the circumference of the sphere, each approximately forming a circle.

Further, the gemstone profiling system 100 includes a controller 114 which is coupled to the actuator 108 and the non-contact measuring unit 110. The controller 114 can operate the actuator 108 to rotate the gemstone 106 through a plurality of orientations or positions. In each position, the non-contact measuring unit 110 can measure the primary dimension of the gemstone 106. For example, the primary dimension can be a distance between a center of rotation of the gemstone 106 and a surface of the gemstone 106. The controller 114 can receive, from the non-contact measuring unit 110, the measured primary dimension in each orientation, and based thereon, the controller 110 can generate a profile of the gemstone 106. As mentioned previously, the profile generated in the planning phase can be used for processing the gemstone 106 further, for example, for cutting the gemstone 106. The controller 114 and its components and operation are explained in further detail with reference to FIG. 2 later.

In one example, FIG. 1B illustrates one implementation of the determination of the distance made by the non-contact measuring unit 110. As can be seen in FIG. 1B, the non-contact measuring unit 110 has a fixed position with reference to the gemstone 106. In said example, a direction of measurement of the non-contact measuring unit 110 makes an angle $\Theta$ with an imaginary plane 116 passing through the center of the gemstone 106 and extending along a direction of the measurement. For instance, the direction of measurement of the non-contact measuring unit 110 is along a line connecting the non-contact measuring unit 110 to the center of the gemstone 106. Since this angle $\Theta$ is fixed and so is the distance between the non-contact measuring unit 110 and the plane 116, the controller 114, in said example, can determine the total distance between the center of the gemstone 106 and the non-contact measuring unit 110, for instance, using trigonometric relations. In other examples, other mathematical relations may be used to determine the total distance. This total distance remains fixed since the center of the gemstone 106 and the non-contact measuring unit 110 remain fixed.

Further, the non-contact measuring unit 110 can directly measure the distance between itself and the surface of the gemstone 106 and provide this distance in each orientation of the gemstone 106 to the controller 114. Accordingly, the controller 114, in said example, can determine the primary dimension, in each orientation or position of the gemstone 106, based on the fixed total distance between the center of the gemstone 106 and the non-contact measuring unit 110 and the varying distance between the surface of the gemstone 106 and the non-contact measuring unit 110. The controller 114 can, for example, simply subtract the two distances and obtain the primary dimension in each position, which in said example, can be the distance between the center and the surface of the gemstone 106 in each position.

Figure 2:
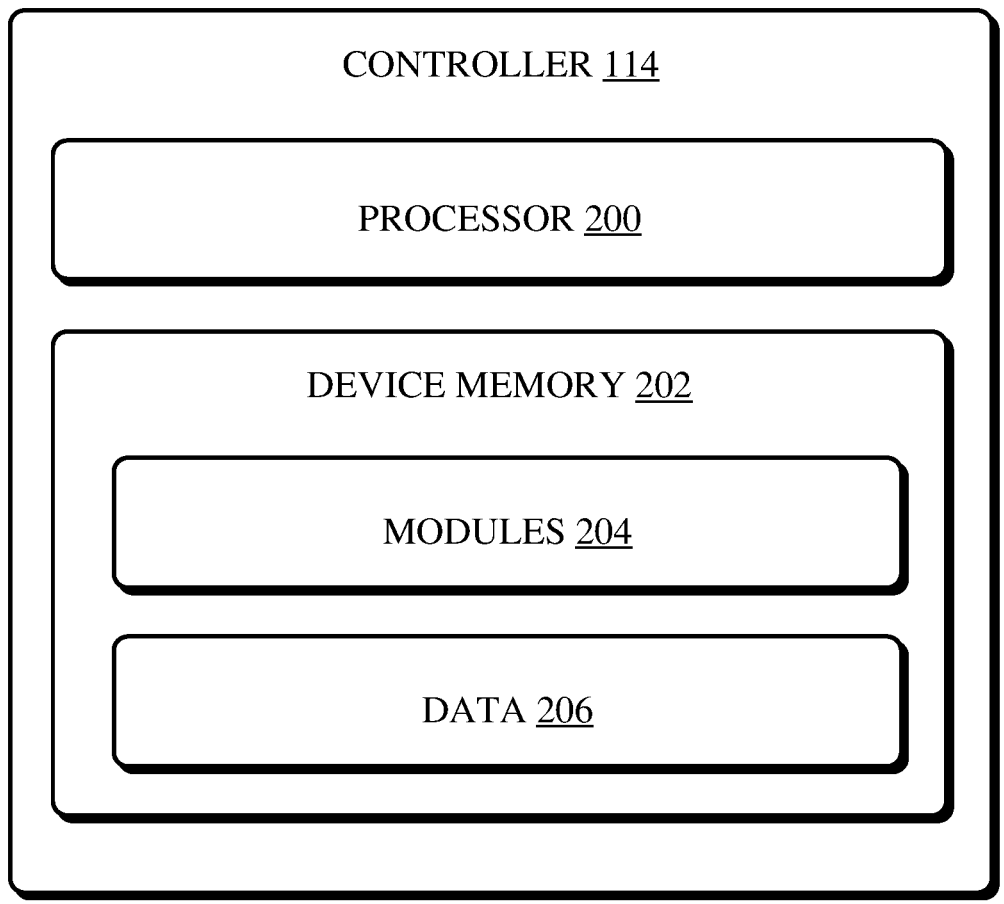
FIG. 2 illustrates a schematic of a controller for the gemstone profiling system, in accordance with an embodiment of the present subject matter.

FIG. 2 illustrates a schematic of the controller 114 for the gemstone profiling system 100, in accordance with an embodiment of the present subject matter. In said embodiment, the controller 114 can be implemented as a microcontroller, a microcomputer, and/or any device that manipulates signals based on operational instructions. According to said embodiment, the controller 114 can include a processor 200 and a device memory 202. The processor 200 can be a single processing unit or a number of units, all of which could include multiple computing units. The processor 200 may be implemented as one or more microprocessors, microcomputers, microcontrollers, digital signal processors, central processing units, state machines, logic circuitries, and/or any devices that manipulate signals, based on operational instructions. Among other capabilities, the processor(s) 200 is provided to fetch and execute computer-readable instructions stored in the device memory 202. The device memory 202 may be coupled to the processor 200 and can include any computer-readable medium known in the art including, for example, volatile memory, such as static random access memory (SRAM) and dynamic random access memory (DRAM), and/or non-volatile memory, such as read only memory (ROM), erasable programmable rom, flash memories, hard disks, optical disks, and magnetic tapes.

Further, the controller 114 may include module(s) 204 and data 206. The modules 204 and the data 206 may be coupled to the processor 200. The modules 204, amongst other things, include routines, programs, objects, components, data structures, etc., which perform particular tasks or implement particular abstract data types. The modules 204 may also, be implemented as, signal processor(s), state machine(s), logic circuitries, and/or any other device or component that manipulate signals based on operational instructions. In addition, the modules 204 may include programs or coded instructions that supplement applications or functions performed by the controller 114.

Additionally, in said implementation, the data 206 amongst other things, may serve as a repository for storing data that is processed, received, or generated, as a result of the execution of one or more modules in the module(s) 204. Although the data 206 is shown internal to the controller 114, it may be understood that the data 206 can reside in an external repository (not shown in the figure), which may be operably coupled to the controller 114. Accordingly, the controller 114 may be provided with input/output (i/o) interface(s) (not shown) to communicate with the external repository to obtain information from the data 206. The i/o interfaces may include a variety of software and hardware interfaces, which may enable the controller 114 to communicate with the external repository and peripheral components of the gemstone profiling system 100, such as the actuator 108 and the non-contact measuring unit 110.

As mentioned previously, the controller 114, when deployed in the gemstone profiling system 100, can be operatively coupled to the actuator 108 and the non-contact measuring unit 110. In operation, the controller 114 can operate the actuator 108 to provide a complete rotation to a gemstone 106 mounted in the holder 104 coupled to the actuator 108. While doing so, the controller 114 can control the actuator 108 so that the gemstone 106 is rotated intermittently through a plurality of positions. For example, the controller 114 can rotate the gemstone 106 every 10 degrees of rotation, taking the gemstone 106 through 36 positions. In another case, depending on the granularity of data to be collected for generating the profile of the gemstone 106, the controller 114 may rotate the gemstone 106 every 5 degrees of rotation, thereby rotating the gemstone through 72 positions.

At each position, the controller 114 can control the non-contact measuring unit 110 to measure a distance of the reference mark 112 on the gemstone 106 from the non-contact measuring unit 110. Accordingly, for each of the various positions that the gemstone 106 is taken through, the controller 114 can obtain the distance of the reference mark 112 on the surface of the gemstone 106 to the non-contact measuring device 110.

Further, based on the distance of the reference mark 112 from the non-contact measuring unit 110 on the surface of the gemstone 106 in respective positions of the gemstone 106, the controller 114 can determine the primary dimension of the gemstone 106 in each of the positions. In an example, the controller 114 can determine the distance based on the methodology explained previously with reference to FIG. 1B above. In an example, the dimension can be relevant for processing of the gemstone 106 and can include the radius of the gemstone 106 measured along the reference mark 112 in case the gemstone 106 is substantially spherical. In other words, the primary dimension can be the distance between the center and the surface of the gemstone 106 measured along the reference mark 112 on the surface of the gemstone 106.

Once the primary dimension is known, the controller 114 can generate a profile of the gemstone 106 based on the primary dimension in each position of the gemstone 106. In an example, the profile can include cutting parameters for processing the gemstone 106, for example, including focal points, height, stroke length, banding angles, and depth for each side of banding.

In another example, the controller 114 can obtain directly the measured value of the primary dimension from the non-contact measuring unit 110, for example, in the form of the distance of the center to the surface of the gemstone 106 at each of the various positions that the gemstone 106 is rotated through. Based on the obtained measurement, the controller 114 can generate the profile of the gemstone 106.

Figure 3:
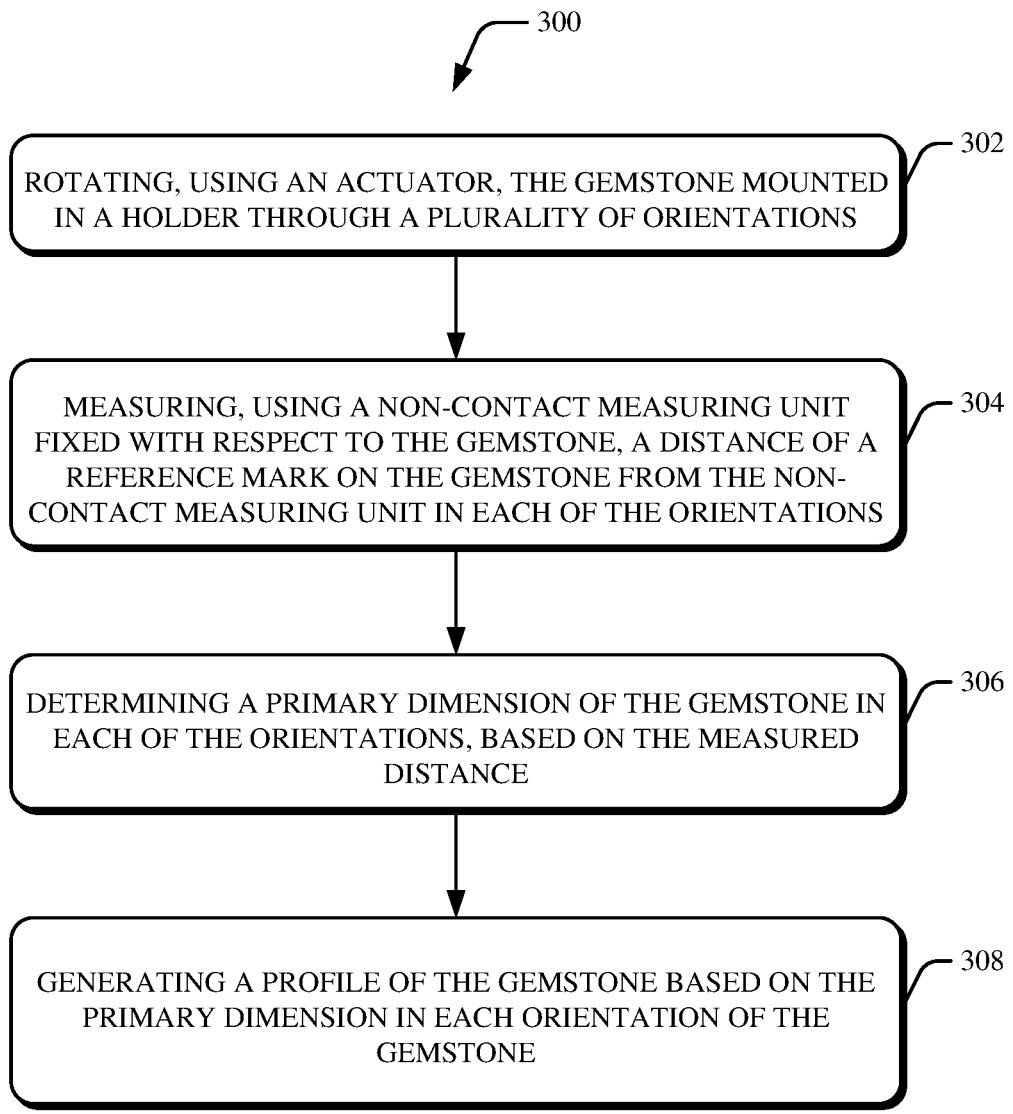
FIG. 3 illustrates a method of profiling a gemstone, in accordance with an embodiment of the present subject matter.

Method 300 is described in FIG. 3 for generating a profile of a gemstone 106, or in other words, for profiling a gemstone 106, according to an implementation of the present subject matter. The order in which the method 300 are described is not intended to be construed as a limitation, and any number of the described method blocks can be combined in any appropriate order to execute the method 300 or an alternative method. Additionally, individual blocks may be deleted from the method 300 without departing from the spirit and scope of the subject matter described herein.

The method 300 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

In the present example, the method 300 may be performed by the controller 114. For the sake of brevity of description of FIG. 3, the components of the controller 114 performing the various steps of the method 300 are not described in detail with reference to FIG. 3. Such details are provided in the description with reference to FIG. 2.

Referring to block 302, the gemstone 106 mounted in a holder 104 is rotated through a plurality of orientations using an actuator 108 under the control of the controller 114. For example, depending on the granularity of data to be collected for generating the profile of the gemstone 106, the controller 114 may regulate the rotation of the gemstone 106. For instance, the controller 114 can rotate the gemstone 106 every 10 degrees of rotation, taking the gemstone 106 through 36 positions or can rotate the gemstone 106 every 5 degrees of rotation, thereby rotating the gemstone through 72 positions.

At block 304, a distance of the reference mark 112 on the gemstone 106 is measured from the non-contact measuring unit 110 in each orientation, using the non-contact measuring unit 110 fixed with respect to the gemstone 106.

At block 306, a primary dimension of the gemstone 106 in each of the orientations is determined, based on the distance of the reference mark 112 from the non-contact measuring unit 110 on the gemstone 106, in respective orientation of the gemstone 106. As explained above, the primary dimension is relevant for processing of the gemstone 106. For example, the primary dimension can be the distance between the center and the surface of the gemstone 106 measured along the reference mark 112 on the surface of the gemstone 106. For instance, in case the gemstone 106 is substantially spherical, the primary dimension can be the radius of the gemstone 106 measured along the reference mark 112.

At block 308, a profile of the gemstone 106 is generated based on the primary dimension in each orientation of the gemstone 106. The generated profile is done so in the planning phase and can be used further for processing of the gemstone 106. In an example, the profile can include cutting parameters for processing the gemstone 106, for example, including focal points, height, stroke length, banding angles, and depth for each side of banding.

Although implementations for gemstone profiling are described, it is to be understood that the present subject matter is not necessarily limited to the specific features of the systems or methods described herein. Rather, the specific features and methods are disclosed as implementations for gemstone profiling.

We claim:

1. A gemstone profiling system comprising:
 a holder for holding a gemstone, the gemstone having a reference mark, wherein the holder is rotatable about a central axis coinciding with a center of the gemstone in a mounted position;
 an actuator coupled to the holder to rotate the holder;
 a non-contact measuring unit fixed with respect to the holder, wherein the non-contact measuring unit is to determine a distance between a center of rotation of the gemstone and a surface of the gemstone; and
 a controller to,
  operate the actuator to rotate the gemstone through a plurality of orientations;
  receive the distance between a center of rotation of the gemstone and a surface of the gemstone in each of the plurality of orientations of the gemstone; and
  generate a profile of the gemstone based on the received distance in the plurality of orientations, wherein the gemstone is processed based on the profile.

2. The gemstone profiling system as claimed in claim 1, wherein the controller is to determine, from the generated profile, cutting parameters for processing the gemstone, the cutting parameters comprising focal points, height, stroke length, banding angles, and depth for each side of banding.

3. A method of profiling a gemstone, the method comprising:
 rotating, using an actuator the gemstone mounted in a holder through a plurality of orientations;
 measuring, using a non-contact measuring unit fixed with respect to the gemstone, a distance of a reference mark on the gemstone from the non-contact measuring unit in each of the plurality of orientations;
 determining a primary dimension of the gemstone in each of the plurality of orientations, based on the distance of the reference mark from the non-contact measuring unit on the gemstone in respective orientation of the gemstone, wherein the primary dimension is relevant for processing of the gemstone, the primary dimension being a distance between a center of the gemstone and a surface of the gemstone measured at the reference mark; and
 generating a profile of the gemstone based on the primary dimension in each orientation of the gemstone, wherein the gemstone is processed based on the profile.

4. The method as claimed in claim 3, wherein the generating the profile comprises determining cutting parameters for processing the gemstone, the cutting parameters comprising focal points, height, stroke length, banding angles, and depth for each side of banding.

5. A controller for a gemstone profiling system, wherein the controller is to:
 operate an actuator to provide a complete rotation to a gemstone mounted in a holder, wherein the gemstone is rotated intermittently through a plurality of positions;
 ascertain, from a non-contact measuring unit, a distance of a reference mark on the gemstone from the non-contact measuring unit in each of the plurality of positions;
 determine a primary dimension of the gemstone in each of the plurality of positions, based on the distance of the reference mark from the non-contact measuring unit on the gemstone in respective position of the gemstone, wherein the primary dimension is relevant for processing of the gemstone, the primary dimension being a distance between a center of the gemstone and a surface of the gemstone measured at the reference mark; and
 generate a profile of the gemstone based on the primary dimension in each position of the gemstone, wherein the gemstone is processed based on the profile.

6. The controller as claimed in claim 5, wherein the controller is to determine cutting parameters for processing the gemstone, the cutting parameters comprising focal points, height, stroke length, banding angles, and depth for each side of banding.

* * * * *